UNITED STATES PATENT OFFICE.

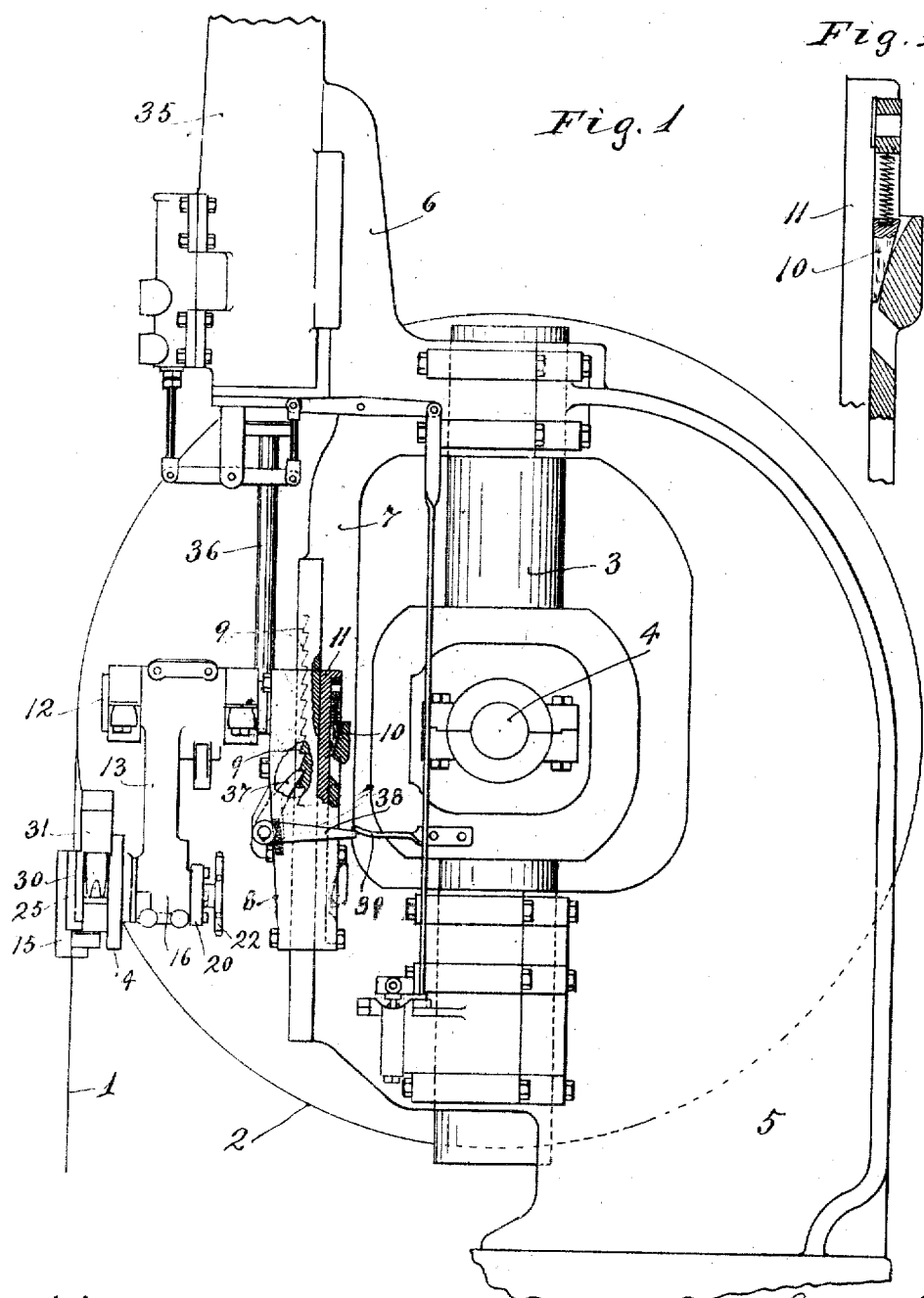

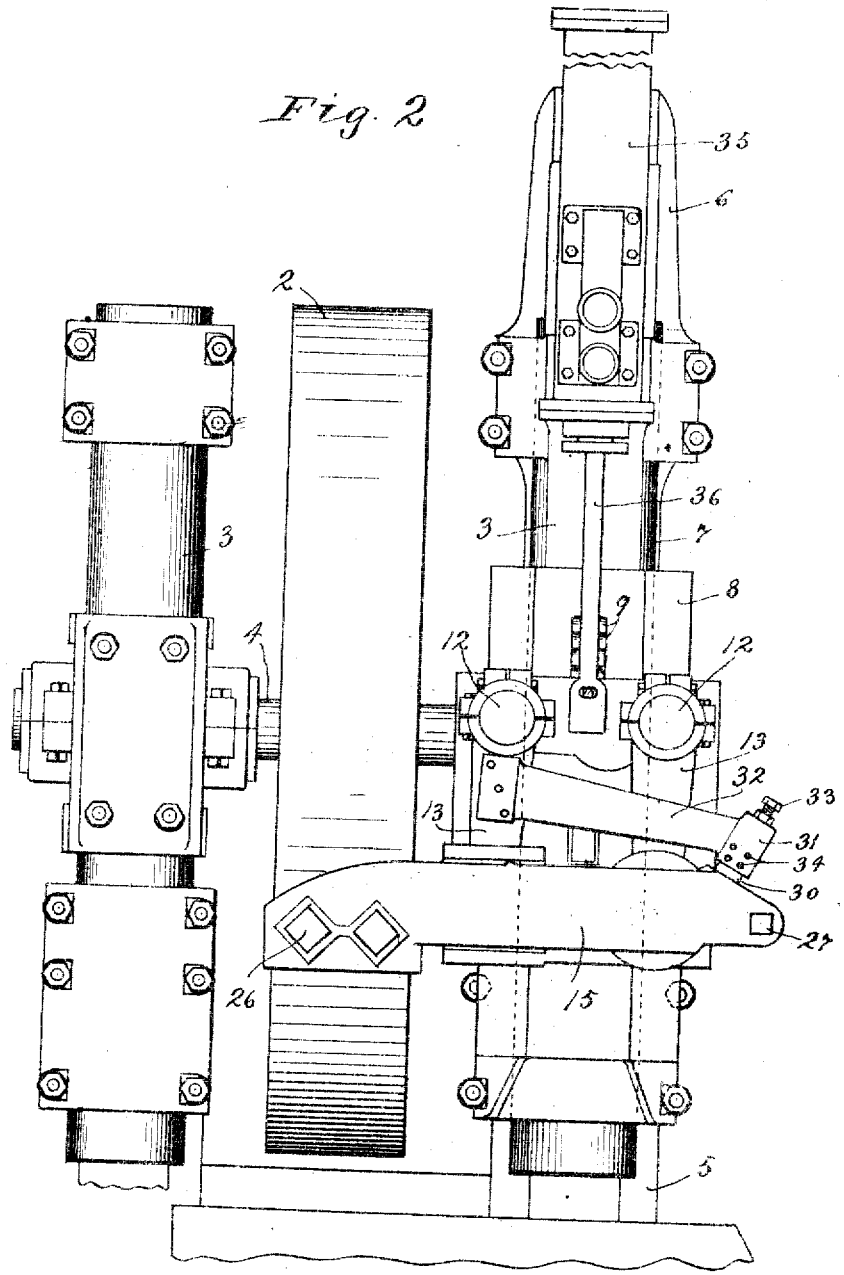

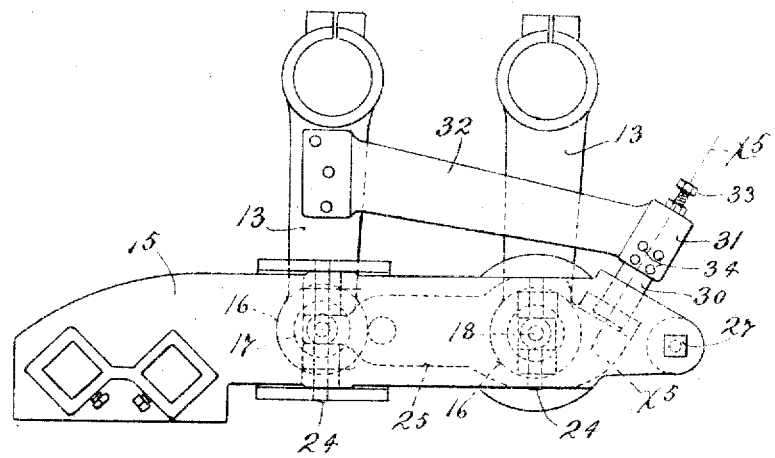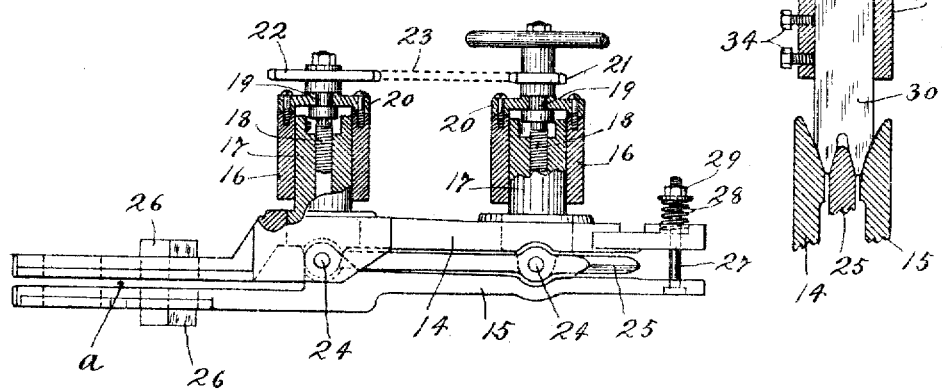

FLETCHER L. WALKER AND HERMANN G. DITTBENNER, OF MINNEAPOLIS, MINNESOTA.

UPPER SAW-GUIDE.

1,260,837.  Specification of Letters Patent.  Patented Mar. 26, 1918.

Application filed April 5, 1916. Serial No. 89,046.

*To all whom it may concern:*

Be it known that we, FLETCHER L. WALKER and HERMANN G. DITTBENNER, citizens of the United States, residing at Minneapolis, in the county of Hennepin and State of Minnesota, have invented certain new and useful Improvements in Upper Saw-Guides; and we do hereby declare the following to be a full, clear, and exact description of the invention, such as will enable others skilled in the art to which it appertains to make and use the same.

Our present invention relates to band saw mills and has for its object to provide certain improvements in and means for adjusting and regulating the upper saw guide.

Generally stated, the invention consists of the novel devices and combinations of devices hereinafter described and defined in the claims.

In the accompanying drawings which illustrate the invention, like characters indicate like parts throughout the several views.

Referring to the drawings:

Figure 1 is a side elevation showing a band saw mill having the several features of our invention applied thereto, the lower portion of the mill being broken away;

Fig. 2 is a front elevation of the parts shown in Fig. 1;

Fig. 3 is a front elevation of the saw guide removed from the machine;

Fig. 4 is a view of the parts shown in Fig. 3, partly in plan and partly in horizontal section; Fig. 5 is an enlarged section taken on the line $x^5$ $x^5$ of Fig. 3, some parts being broken away; and Fig. 1ª is a detail in section showing one of the automatic take-up wedges.

Of the parts of the band saw mill, the numeral 1 indicates the band saw, the numeral 2 the upper band saw wheel, the numeral 3, the vertically adjustable columns having the customary bearings in which the shaft 4 of the wheel 2 is journaled, and the numeral 5 indicates the laterally spaced brackets in which the columns 3 are mounted to move vertically. One of the brackets 5 is provided with an upwardly extended arm 6 and a depending shoe guide 7.

The guide shoe 8 which carries the upper saw guide, embraces and is mounted to slide vertically on a flange of the shoe guide 7, and this flange is provided with ratchet teeth 9 for an important purpose which will presently appear. Play, due to wear between the shoe 8 and guide 7, is taken up automatically by a plurality of spring-pressed wedges 10 seated in the back of the shoe and engaging a wear plate 11 that is movably mounted in the said shoe and directly engages the back of the flanges of the guide 7.

The guide shoe 8, at its upper portion, is provided with heavy horizontally projecting parallel studs 12 on which the upper ends of depending parallel links 13 are pivotally mounted. The jaws or jaw plates 14 and 15 of the saw guide are pivotally supported for horizontal swinging movements by the lower ends of these parallel links 13, and, as shown, this is accomplished by a novel means, the preferred arrangement of which is, as follows:

At their extreme lower ends, the said links 13 are formed with sleeve-like heads 16 in which gudgeons 17 are mounted for rotary and endwise sliding movements. The sliding movements of the said gudgeons are imparted by adjusting screws 18 having threaded engagement therewith and swiveled at 19 to head plates 20 that are rigidly but detachably secured to the sleeves 16. These screws, as illustrated, have the same threads, but at their outer ends, they are provided with sprocket wheels 21 and 22, the latter of which is twice the diameter of the former. A sprocket chain 23 runs over the alined sprockets 21 and 22. The projecting axis of the screw 18 having the small sprocket 21 is twice as far as is the projected axis of the other screw, from a point marked *a* on Fig. 4, and which point is between the extended saw-guiding ends of the jaws, and at approximately the transverse center of the guide saw 1. This relation of the parts is important, as will be hereinafter made clear.

The projecting ends of the gudgeons 17 are passed with loose engagement through the inner jaw plate 14, and between the jaw plates are provided with the hinge lugs that are pivotally connected by vertical pins 24 to a centering plate 25. Furthermore, the two jaw plates 14 and 15 are provided with interlapping lugs that are pivoted on the pin 24 that is nearest to the saw, so that the two jaws open and close on the said pivot pin. At their saw-embracing ends, the jaw plates 14 are provided with the customary wooden guide plugs 26 that directly engage the sides of the saw. The other ends of the said jaw plates 14 and 15 are subject to a spring device that tends to yieldingly draw the same together and to separate the plug-equipped or saw guiding ends of said jaw plates. This spring device, as shown, comprises a bolt 27 passed through perforations in said plates 14 and 15, and provided with a spring 28 compressed between said arms 14 and a nut 29 on said bolt. The right hand or outer end of the centering plate 25 is beveled and the adjacent end portions of the jaw plates are heavily beveled, as best shown in Figs. 4 and 5, and these beveled surfaces are normally engaged by a duplex wedge 30 that is rigidly but adjustably carried in a socket 31 formed in the free end of a wedge arm 32 that is carried by and rigidly secured to one of the links 13. As shown, the wedge 30 is adapted to be adjusted by a screw 33 threaded in the top of the socket 31, and is adapted to be held where set by set screws 34 screwed into the sides of the said socket.

The guide shoe 8, and the saw guide carried thereby, are arranged to be vertically adjusted in a well known manner, by a cylinder and piston engine. As shown, the cylinder 35 of this guide adjusting engine is rigidly secured to the bracket arm 6, and its piston rod 36, at its lower end, is attached to the upper portion of the said shoe 8. The means for controlling the reciprocating movements of the engine piston, and, consequently, of the guide shoe and saw guide, are well known and need not here be further considered, except to state that by proper manipulation of the same, the said shoe and saw guide which are very heavy counterbalanced structures, may be easily raised and lowered, at will.

The best sawing action is produced by having the saw guide located as close as practicable to the upper guide wheel 2, and yet, as, of course, will be understood, serious damage to the saw and other mechanism is produced if the saw guide were permitted to run into the upper saw wheel. To avoid this, I provide an automatic shoe lock, of which, in the preferred construction, the ratchet teeth 9 on the saw guide 7 is a coöperating element.

For coöperation with the said ratchet teeth, the shoe 8 is provided with a spring-retracted lock dog 37, which, at one end, has a projecting arm 38 arranged to engage a stop 39. This stop 39 is in the form of a strong spring arm, one end of which is secured, as shown, to the yoke portion of one of the vertically movable columns 3, so that it always bears a predetermined position, in respect to the upper saw wheel. The said stop may take various forms and be applied in different ways, but it must bear a constant or known predetermined relation to the upper saw wheel and which partake of the vertical adjustments thereof. With this automatic lock, the guide shoe and saw guide may be freely adjusted vertically, but when moved upward so that the saw guiding ends of the jaws too closely approach the upper saw wheel, the arms 38 will strike the stop 39 and force the lock dog 37 into engagement with one of the ratchet teeth 9, thereby positively locking the said shoe and saw guide so that they cannot be moved farther upward. It may sometimes happen that the free end of the arm 38 will be forced above the stop 39 before the dog has been engaged with a ratchet tooth, in which case, the said stop will yield to permit such movement, and, of course, the said arm will pass freely over the stop under downward movement. As soon as the shoe and guide are again lowered, the lock dog will be automatically retracted by its spring so that upward and downward movements of the saw guide below the extreme upper position noted, will be freely accomplished by manipulation of the adjusting engine. This automatic saw guide lock constitutes an important feature of the present invention.

It is, of course, a well known fact that the toothed-edge of a band saw, because of the set of the teeth, is much thicker than the body of the saw. It frequently happens that in making the first cut-off from a log, the operator will not correctly judge the size of the log, and hence, will not raise the saw guide sufficiently to clear the log, and in this case, the said log, moving in a direction from left toward the right, in respect to Fig. 2, will strike the ends of the saw guiding jaws 14 and 15 and force the same toward the right, under which movement, the jaws will be raised, while maintained in a horizontal position, until they clear the log. With a double edge band saw, such movement of the jaws would cause the rear teeth of the band saw to cut away the saw-engaging faces of the wooden guide plugs, so that when they are again forced back to working position on the saw, there will be too great play between the same and the saw. With this construction described, however, the initial receding movement of the jaws 14 and 15 and supporting links 13 raises the arm 32, and carries the duplex wedge 30 from between the beveled surfaces of the said jaws and centering plate 25, and the spring 28 then instantly separates the plug-equipped ends of the jaws so that the plugs will not be cut by the rear teeth of the band saw. The band saw shown is a two-way saw, that is, a saw having teeth on both edges, and the device just described is especially adapted for use in connection therewith, but, nevertheless, it is desirable, even when used on a one-way saw, that is, a saw having teeth on one edge only.

After the saw guide has been displaced, as stated, it can easily be restored, by again pressing the same downward and toward the saw, under which movement to normal position, the duplex wedge again engages the beveled surfaces of the jaws and centering plates, overcomes the spring 28, and restores the guide plugs to normal action on the saw.

It will frequently happen that a band saw, because the one edge thereof is of greater length than the other in sawing, will tend to lead toward one side or the other, and thus cut a tapered board. This tendency of the saw to lead or drift toward one side, may be overcome by setting the saw guide to lead slightly in the opposite direction, or so that it will cut straight. Such adjustments are arranged to be given to the saw guide, that is, to the jaws or jaw plates thereof, by the mechanism best shown in Fig. 4 and which mechanism includes the before described screws 18, and may be well designated as a saw lead adjuster.

By the described arrangement of the said parts, the two gudgeons 17 will be given a differential movement so that when adjusted horizontally, the two jaw plates 14 and 15 will be moved pivotally on the point $a$ before noted. Otherwise stated, the screw 18, at the right, will rotate twice as fast as the screw at the left, and, consequently, the right hand gudgeon 17 will be given twice as much axial movement as the left hand gudgeon, and, as the right hand gudgeon is twice as far as the left hand gudgeon from the point $a$, it is evident that the jaw plates will be given an oscillatory movement around the point $a$ as a pivot point. Very slight movement of the said plates will be sufficient to correct the lead of the saw in the most extreme cases.

It will be understood that means for automatically taking up the play between the shoe and guide is very important, because, even slight play between these parts would permit the saw guide to shift materially from its proper working position. The angle of the automatic take-up wedges should be such that they cannot be pressed backward by pressure applied laterally to the same from the shoe. Otherwise stated, they will automatically take up play but cannot be accidentally forced in a reverse direction or made to give back the play once taken up.

What we claim is:

1. In a band saw mill, the combination with a saw guiding wheel that is adjustable for band saws of different lengths, of a shoe adjustable independently of the adjustment of the wheel in a direction parallel to the line of adjustment thereof, means for thus adjusting said shoe, a saw guide carried by said shoe, an automatic lock limiting the movement of said shoe in a direction to carry said saw guide toward said wheel, and a lock actuating stop adjustable with said wheel.

2. In a band saw mill, the combination with a wheel that is adjustable for band saws of different lengths, of a relatively fixed shoe guide having ratchet teeth, a guide shoe slidable on said shoe guide, means for moving said shoe guide, a saw guide carried by said shoe guide, a yieldingly retracted lock dog carried by said shoe, and a dog actuating device adjustable with said wheel and operative to engage said dog with said ratchet teeth to thereby limit the movement of said saw guide toward said wheel.

3. In a band saw mill, the combination with vertically movable columns, of an upper saw wheel adjustable with said columns for band saws of different lengths, a relatively fixed shoe guide having ratchet teeth, means for adjusting said shoe vertically, a saw guide carried by said shoe, a yieldingly retracted lock dog carried by said shoe and provided with a projecting arm, and a dog actuating element carried by one of said columns and operating on the arm of said dog to engage the latter with the ratchet teeth of said guide, to thereby automatically limit the movements of said saw guide toward said upper saw wheel.

4. In a band saw mill, the combination with saw guiding jaws mounted for upward receding movements, means for normally holding said jaws operative to guide the band saw, and means for automatically separating the saw guiding ends of said jaws when the latter are given receding movement.

5. In a band saw mill, the combination with the upper wheel and band saw, of a link support, links pivoted to said support, saw guiding jaws carried by the free ends of said links, yielding means tending to separate the saw guiding ends of said jaws, and a wedge device carried by one of the said links, normally engaging said jaws and holding the saw guiding ends thereof operative to guide the same, the swinging movement of said link and receding movement of said jaws serving to retract said wedge device and permit the said yielding means to separate the saw guiding ends of said jaws.

6. In a band saw mill, the combination with the upper saw wheel and band saw, of a link support, links pivoted to said support at their upper ends, jaws pivoted to the lower ends of said links, a spring device tending to hold the projecting ends of said jaws operative to guide the saw, the said jaws at their other ends having wedge engaging surfaces, a centering plate located between said jaws and fixed against lateral movements but partaking of the other movements of said jaws, an arm rigidly secured to one of the links and provided with a duplex wedge normally engaging said centering plate and the wedge surfaces of said jaws and holding the saw guiding ends of said jaws operative to guide the saw, but which wedge is retracted by an initial receding movement of said jaws and links from normal positions.

In testimony whereof I affix my signature in presence of two witnesses.

FLETCHER L. WALKER.

Witnesses:
R. F. PRAY,
MABEL E. ABRAHAM.

In testimony whereof I affix my signature in presence of two witnesses.

HERMANN G. DITTBENNER.

Witnesses:
HARRY D. KILGORE,
FRANK D. MERCHANT.